(12) United States Patent
Moulin et al.

(10) Patent No.: US 11,208,264 B2
(45) Date of Patent: Dec. 28, 2021

(54) SYSTEM FOR STORING AND TRANSPORTING OBJECTS STORED IN RACKS OF A WAREHOUSE

(71) Applicant: EXOTEC SOLUTIONS, Euralille (FR)

(72) Inventors: Romain Moulin, Paris (FR); Renaud Heitz, Villeuneuve d'Ascq (FR)

(73) Assignee: EXOTEC SOLUTIONS, Euralille (FR)

( * ) Notice: Subject to any disclaimer, the term of this patent is extended or adjusted under 35 U.S.C. 154(b) by 0 days.

(21) Appl. No.: 16/780,211

(22) Filed: Feb. 3, 2020

(65) Prior Publication Data

US 2020/0172332 A1 Jun. 4, 2020

Related U.S. Application Data

(63) Continuation of application No. 16/615,308, filed as application No. PCT/EP2018/070551 on Jul. 30, 2018.

(30) Foreign Application Priority Data

Oct. 12, 2017 (FR) ...................................... 1759567

(51) Int. Cl.
*B65G 1/04* (2006.01)
*B65G 1/06* (2006.01)

(52) U.S. Cl.
CPC .......... *B65G 1/0435* (2013.01); *B65G 1/0492* (2013.01); *B65G 1/065* (2013.01); *B65G 2201/0258* (2013.01)

(58) Field of Classification Search
CPC .................................................. B65G 1/0435
See application file for complete search history.

(56) References Cited

U.S. PATENT DOCUMENTS 3,782,565 A * 1/1974 Doran .................. B65G 1/0435
414/274
4,750,633 A * 6/1988 Schafer ................ B65G 1/0435
206/599

(Continued)

FOREIGN PATENT DOCUMENTS

DE 10241347 A1 * 3/2004 ........... B65G 1/0435
DE 102012017985 A1 4/2014
WO 2016196815 A1 12/2016

OTHER PUBLICATIONS

International Search Report dated Nov. 2, 2018 for corresponding International Application No. PCT/EP2018/070551, filed Jul. 30, 2018.

(Continued)

*Primary Examiner* — James Keenan
(74) *Attorney, Agent, or Firm* — David D. Brush; Westman, Champlin & Koehler, P.A.

(57) ABSTRACT

A storage and transport system in a warehouse for an object intended to be stored in a rack of the warehouse. The system includes: a bin suitable for accommodating the object; and a powered trolley capable of climbing along the rack including a device for gripping and removing the bin. The gripping and removal device includes a support mounted so as to be movable relative to the chassis of the trolley between: an extended position, in which the support extends at least partially on a lateral edge of the carriage out of alignment with the chassis; and a retracted position, in which the support is housed opposite the chassis. The support includes a structural element and a protruding finger fixed with respect to the structural element and facing upward. The bottom of the bin has a fingerprint configured to accommodate a portion of the finger.

9 Claims, 3 Drawing Sheets

(56) References Cited

U.S. PATENT DOCUMENTS

| | | | | |
|---|---|---|---|---|
| 6,234,550 B1* | 5/2001 | Stoltenhoff | ............ | B65G 1/0435 |
| | | | | 294/119.1 |
| 6,390,756 B1* | 5/2002 | Isaacs | ...................... | B07C 3/008 |
| | | | | 414/280 |
| 6,558,101 B2* | 5/2003 | Inui | ...................... | B65G 1/0435 |
| | | | | 414/267 |
| 6,805,526 B2* | 10/2004 | Stefani | ...................... | B65G 1/04 |
| | | | | 414/278 |
| 8,790,061 B2* | 7/2014 | Yamashita | ............ | B65G 1/0492 |
| | | | | 414/280 |
| 8,928,481 B2* | 1/2015 | Abe | ...................... | B65G 1/0435 |
| | | | | 235/383 |
| 8,956,099 B2* | 2/2015 | Olszak | .................. | B65G 1/0435 |
| | | | | 414/281 |
| 9,181,030 B2* | 11/2015 | Zombori | .................. | B65G 1/04 |
| 9,718,617 B2* | 8/2017 | Koide | .................. | B65G 1/0435 |
| 10,589,928 B2* | 3/2020 | Aschauer | ............. | B65G 1/0435 |
| 10,633,186 B2* | 4/2020 | Valinsky | ............. | B65G 1/0492 |
| 10,710,803 B2* | 7/2020 | Grosse | .................. | B65G 1/0435 |
| 10,737,817 B2* | 8/2020 | Rogers | .................. | B65G 1/0435 |
| 10,894,663 B2* | 1/2021 | Kapust | .................. | B65G 1/0435 |
| 2004/0191032 A1* | 9/2004 | Foulke | ...................... | B65G 1/04 |
| | | | | 414/280 |
| 2005/0047895 A1 | 3/2005 | Lert, Jr. | | |
| 2006/0245862 A1* | 11/2006 | Hansl | .................. | B65G 1/0435 |
| | | | | 414/281 |
| 2016/0289001 A1 | 10/2016 | Shibata et al. | | |

OTHER PUBLICATIONS

Office Action dated Mar. 23, 2020 from the USPTO for corresponding U.S. Appl. No. 16/615,308, filed Nov. 20, 2019.

Written Opinion of the International Searching Authority dated Nov. 2, 2018 for corresponding International Application No. PCT/EP2018/070551, filed Jul. 30, 2018.

Machine Translation of Written Opinion of the International Searching Authority dated Nov. 2, 2018 for corresponding International Application No. PCT/EP2018/070551, filed Jul. 30, 2018.

* cited by examiner

SYSTEM FOR STORING AND TRANSPORTING OBJECTS STORED IN RACKS OF A WAREHOUSE

1. CROSS-REFERENCE TO RELATED APPLICATIONS

This Application is a Continuation Application of U.S. application Ser. No. 16/615,308, filed Nov. 20, 2019, which is a Section 371 National Stage Application of International Application No. PCT/EP2018/070551, filed Jul. 30, 2018, and published as WO 2019/072432 on Apr. 18, 2019, not in English, the contents of which are incorporated herein by reference in their entireties.

2. FIELD OF THE INVENTION

The field of the invention is that of warehouse logistics and in particular the handling and transport of parts or products.

More precisely, the invention concerns a storage and transport system in a warehouse for at least one object intended to be stored in a rack of said warehouse.

In particular, the invention has an application in a warehouse for order picking in a supply chain.

3. STATE OF THE ART

In product storage warehouses, it is known to use robots to pick containers containing specific products from shelves and transport them to another location, such as an order picking station.

To pick up or place bins in high-rise shelves, robots were equipped with a telescopic fork that slides on a mast. To pick up a bin, the fork moves along the mast until it reaches a high position just below the bottom level of the bin, then slides under the bin while unfolding. By slightly lifting the fork, the robot then lifts the bin from the shelf where it is placed and can move it.

However, this telescopic fork technique has the disadvantage that the bins are overhanging the fork during transport, which can destabilise the robot. In addition, forks that do not bend under the load must be provided so that they do not come to rest on the bin below the one being picked, which makes the entire robot heavier.

It was also proposed to use two arms to remove bins, which slide on the sides of the bin and from which fingers are pulled out to pull the bin.

A disadvantage of this known technique is that there must be a space between the bins to slide the arms, which reduces the number of bins that can be stored on a rack.

Another disadvantage of this known technique is that it is complex to implement because it requires an actuator for each finger.

4. SUMMARY OF THE INVENTION

An aspect of the present disclosure relates to a storage and transport system in a warehouse for at least one object intended to be stored in a rack of said warehouse, comprising:
at least one bin suitable for accommodating said object and suitable for being housed in said rack;
a powered trolley comprising climbing means adapted to cooperate with said rack to enable said trolley to rise along said rack, said trolley comprising a device for gripping and removing said bin.

According to the invention, said gripping and removal device comprises a support mounted so as to be movable relative to the chassis of said trolley between:
an extended position, in which said support extends at least partially on a lateral edge of said trolley out of alignment with said chassis; and
a retracted position, in which said support is housed opposite said chassis;
said support comprising a structural element, such as a tray, a frame or a bar, and at least one protruding finger fixed with respect to said structural element and facing upward, and the bottom of said bin has at least one fingerprint configured to accommodate at least a portion of said finger.

Thus, in a new and particularly clever way, the invention proposes to take, or respectively, to deposit a product storage bin in a rack from below by at least partially engaging one or more fingers in fingerprints formed in the bottom of the bin, to be able to lift and pull the bin.

In the context of the invention, said support may comprise a tray, a frame, a bar or any other known structure on which said protruding finger or fingers may rest.

The term "facing upward" also means that the protruding finger is oriented in a substantially vertical direction and points in a direction opposite to that of the ground.

Advantageously, said support is mounted so that it can move relative to said chassis so that it can take a first extended position in which said support extends on one side of said chassis and a second extended position in which said support extends on the other side of said chassis.

This makes it possible to pick up containers from shelves on either side of the trolley.

According to a particular aspect of the invention, said support comprises four fingers arranged in relation to each other in such a way as to form a rectangle.

In variants of this embodiment of the invention, said support may include two fingers, three fingers aligned or arranged in relation to each other so as to form a triangle.

According to an advantageous embodiment of the invention, said support is fixed to a slide guided on a rail, extending in a direction perpendicular to the direction of advance of said trolley.

In a particular embodiment of the invention, said support is formed in one piece.

In a particularly advantageous embodiment of the invention, said powered trolley is an automated guided powered trolley.

Advantageously, said chassis has a vertical stop to prevent said bin from sliding in the direction of said stop, when said gripping and removal device is in said retracted position and supports said bin.

According to a preferential aspect of the invention, said bin is made of injection-moulded plastic.

Preferably, the bottom of said bin has at least two indentations, each configured to accommodate at least a portion of said finger and symmetrically arranged with respect to an axis of symmetry of said bottom.

This means that the bin can be removed from a rack in any direction.

According to an advantageous embodiment of the invention, said climbing means comprise at least two powered gear wheels of axes substantially orthogonal to the axes of the running wheels of said trolley capable of engaging with the links of a substantially tensioned roller chain or the teeth of a rack extending along an amount of said rack.

5. LIST OF FIGURES

Other features and advantages of the invention will become evident on reading the following description of one particular embodiment of the invention, given by way of illustrative and non-limiting example only, and with the appended drawings among which:

6. DETAILED DESCRIPTION OF THE INVENTION

Figure 1:
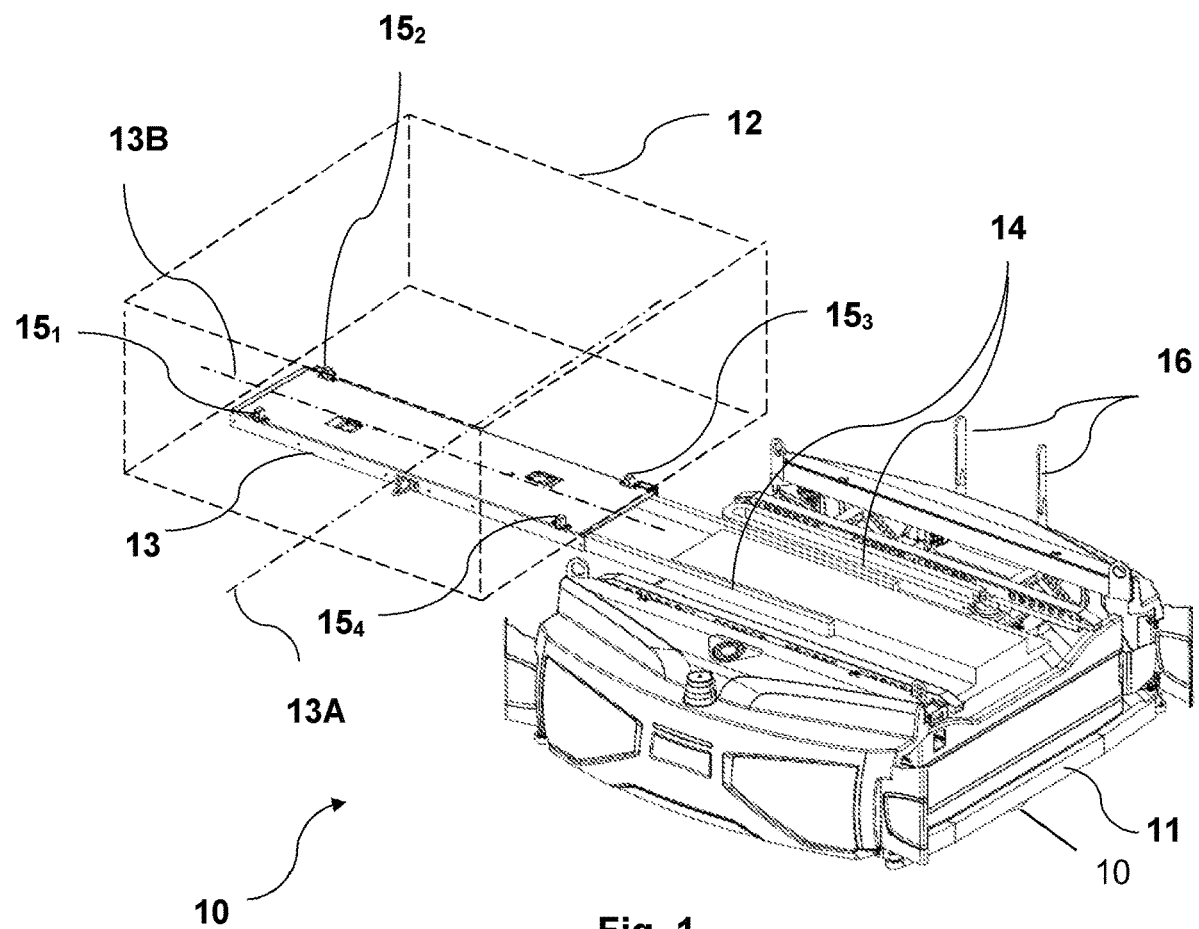
FIG. 1 is a perspective view of an example of embodiment of a object storage and transport system according to the invention, in which the bin of the bin gripping and depositing device is deployed.

FIG. 1 illustrates an example of embodiment of a storage and transport system for objects in a warehouse according to the invention.

This system 10 consists of an automated guided powered trolley 11 and a polypropylene bin 12 with a substantially rectangular parallelepipedic shape (schematically represented by dotted lines in FIG. 1) for storing products.

The trolley 11 is equipped with four running wheels 10 to be able to move on the floor of a warehouse and four toothed wheels (hidden in FIG. 1) with axles perpendicular to the running wheels 10 that can be deployed on the sides of the trolley to allow it to climb between two facing shelves along their uprights.

On its upper side, trolley 11 has a tray 13, which supports bin 12, mounted on two slides 14 on rails, shown in a position deployed on one side of trolley 11 in FIG. 1. As shown in FIG. 1, the tray 13 extends completely out of alignment with said trolley chassis 11 on the left side edge of the trolley, when fully extended. Thanks to a motor to operate the slides 14 (not shown in FIG. 1), the tray 13 can also slide towards the chassis to a retracted position in which the tray 13 overhangs the chassis of the trolley 11. It should be noted that in the retracted position the bin 12 can come to rest on the two vertical pins 16 projecting from the chassis of the trolley 11, to prevent a fall.

Four fingers $15_1$ to $15_4$ are screwed onto the tray 13, each near one of the upper corners of the tray 13, in symmetrical positions with respect to the two symmetry axes 13A and 13B of the rectangular tray 13.

Figure 2:
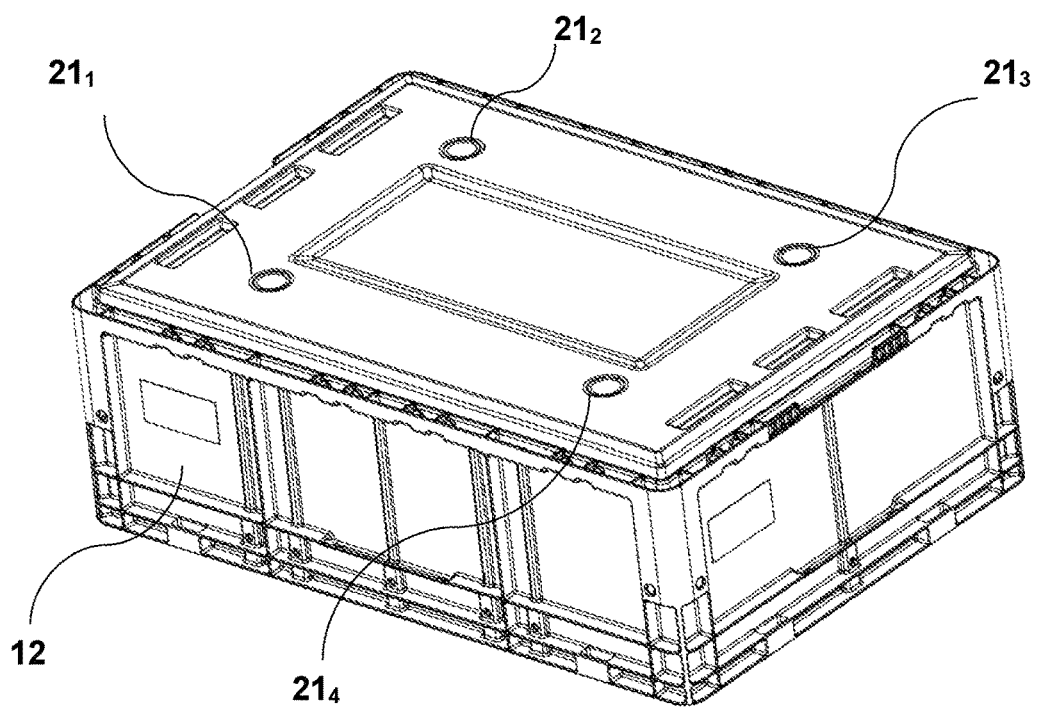
FIG. 2 is a bottom view of one of the bins of the object storage and transport system according to the invention presented in reference to FIG. 1.

As shown in FIG. 2, in a view from below the bin 12, the bottom of the bin 12 has four substantially cylindrical hollow indentations $21_1$ to $21_4$ forming the corners of a rectangle of identical shape to that formed by fingers $15_1$ to $15_4$ of the tray 13.

The following are described the different steps allowing the trolley 11 to pick up a bin 31 identical to bin 12 in a warehouse rack 32 with reference to FIGS. 3A to 3D. In this example, bin 31 is stored in the third row in height of rack 32 and rests on its edges on two "L" angles 34 of rack 32.

Figure 3A:
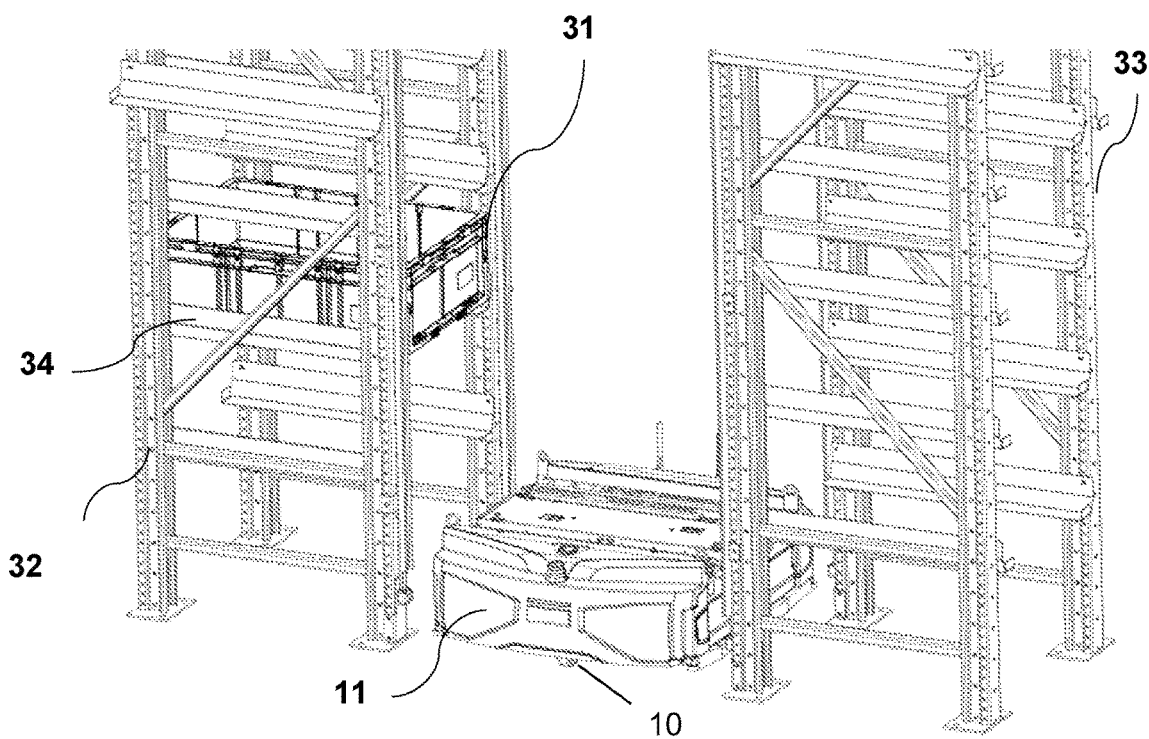
FIGS. 3A to 3D illustrate the powered trolley of the object storage and transport system according to the invention presented in reference to FIG. 1 respectively on the ground, when approaching a bin, when its sliding bin is deployed under the bin and when its sliding bin is fixed to the bin.

In a first step, illustrated in FIG. 3A, the trolley 11 moves forward to the ground and stops in front of the rack 32 containing the bin 31, leaving the bin 31 on its left side.

Figure 3B:
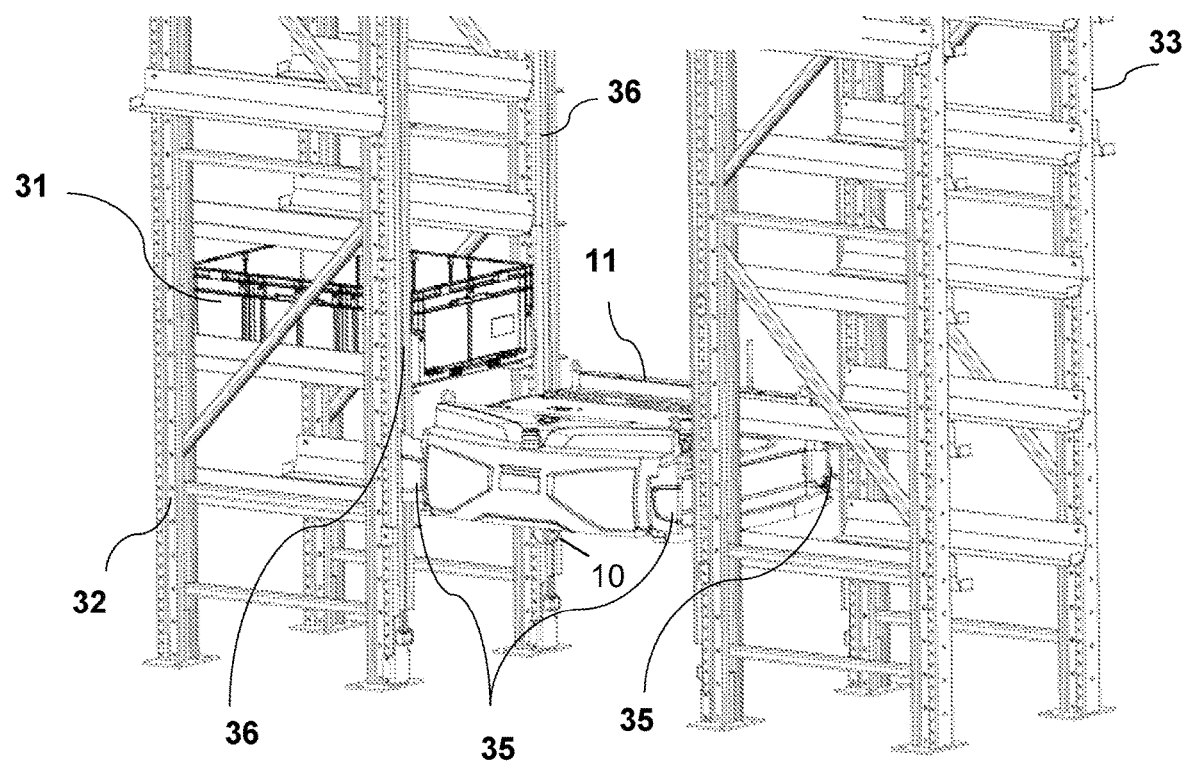

The trolley 11 then extends transversely the four arms 35 carrying sprockets, so that they engage with the chains 36 stretched on the uprights of the rack 32 and the rack 33 facing the latter, and climbs along the shelves, controlling the rotation of the sprockets, to a position, shown in FIG. 3B, where the upper face of the tray 13 is located a few centimetres lower than the height of the bottom surface of the bin 12.

Figure 3C:
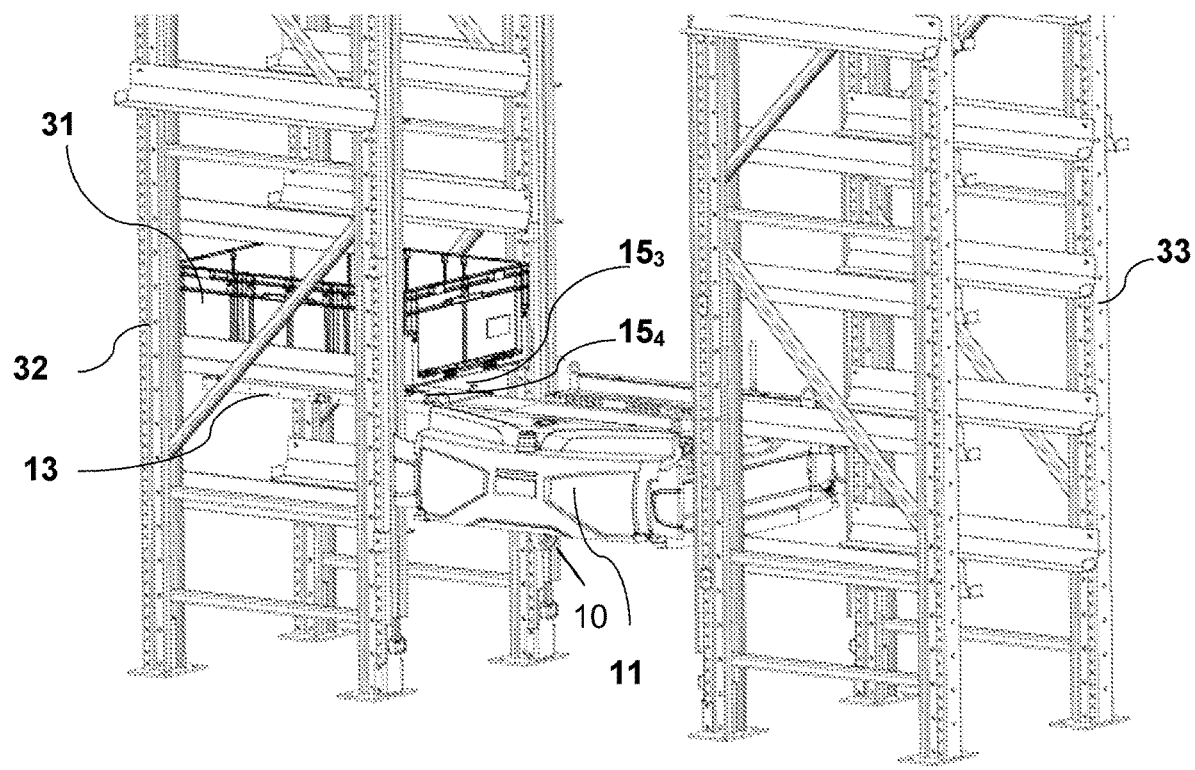

The trolley 11 then operates the motor to cause the slides 14 to slide on the left side of its chassis, so that the tray 13 is deployed under the bin 12 from the retracted position shown in FIG. 3B to a full deployment position shown in FIG. 3C.

Figure 3D:
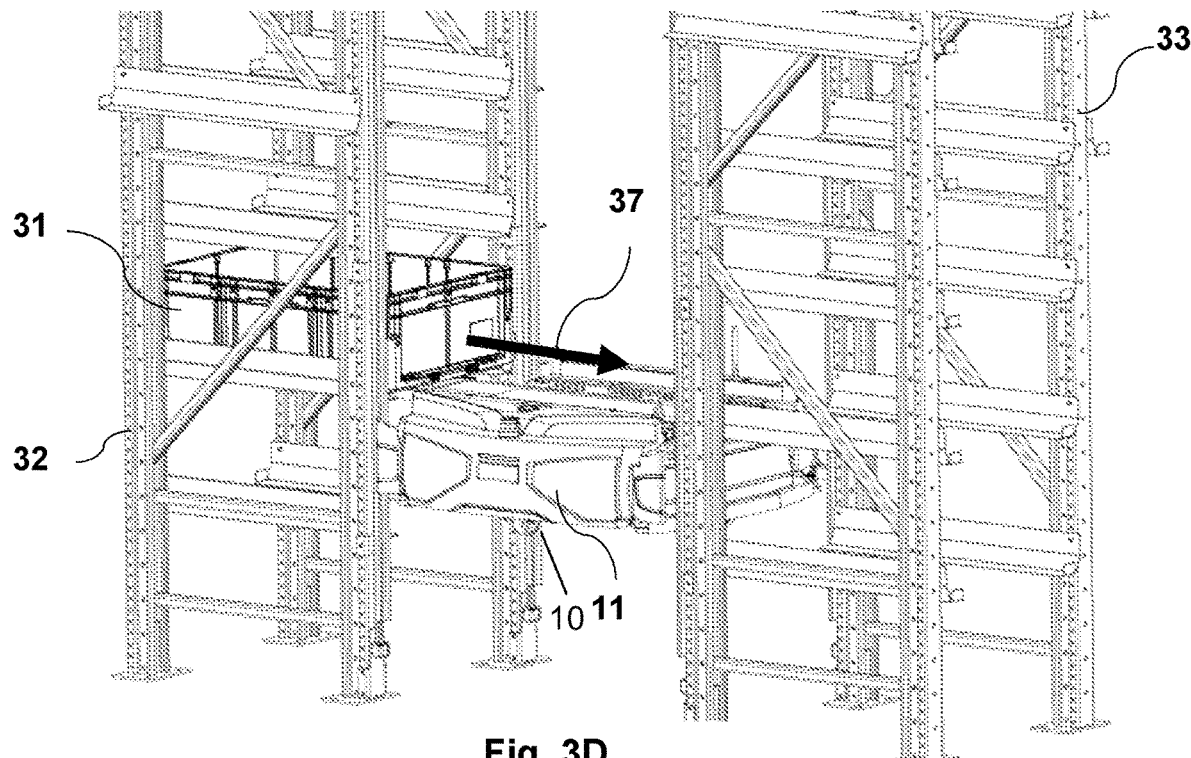

In a final step, illustrated in FIG. 3D, the trolley 11 rises again along the uprights by a few centimetres so that the upper part of fingers $15_1$ to $15_4$ penetrate the fingerprints $21_1$ to $21_4$ of the bottom of the bin and then rises again by two centimetres so that the bin is slightly raised above the corner pieces 34.

It is then sufficient for trolley 11 to return the tray 13 to its retracted position, by causing the slides 14 to slide in the direction of arrow 37, to be able to go down with bin 31 along the uprights of racks 32, 33.

An exemplary embodiment of the present disclosure remedies the shortcomings of the state of the art mentioned above.

More precisely, an exemplary embodiment provides a technique for storing and transporting objects in a warehouse that is simple to implement.

An exemplary embodiment provides such a technique that can be implemented in a warehouse where the products are stored in containers that are closely spaced from each other in shelves.

An exemplary embodiment provides such a technique which is reliable.

An exemplary embodiment provides such a technique that is simple to install, and with reduced cost price.

An exemplary embodiment provides such a technique which is heavy-duty and reliable.

Although the invention has been described in connection with several particular embodiments, it is obvious that it is not limited thereto and that it comprises all the technical equivalents of the means described and their combinations if they are within the scope of the invention.

The invention claimed is:

1. A storage and transport system in a warehouse for at least one object intended to be stored in a rack of said warehouse, comprising:
   at least one bin suitable for accommodating said object and suitable for being housed in said rack;
   an automated guided powered trolley comprising:
      a chassis;
      running wheels configured to move the trolley on a floor of the warehouse; and
      a climbing element adapted to cooperate with said rack to enable said trolley to rise along said rack, said trolley comprising a gripping and removing device to grip and remove said bin,
   wherein said gripping and removing device comprises a support only slidably mounted relative to the chassis of said trolley between:
      a first extended position, in which said support extends on one side of said chassis on a first lateral edge of said trolley completely out of alignment with said chassis; and
      a retracted position, in which said support is housed opposite said chassis; and
      a second extended position in which said support extends on another side of said chassis completely out of alignment with said chassis;

said support including a structural element on which the bin can rest and at least one protruding finger fixed with respect to said structural element and facing upward, and a bottom of said bin has at least two fingerprints, each configured to accommodate at least a portion of said at least one protruding finger and arranged symmetrically with respect to an axis of symmetry of said bottom that is perpendicular to an axis along which the support slides.

2. The storage and transport system according to claim 1, wherein said support comprises four fingers arranged relative to each other in a rectangular pattern.

3. The storage and transport system according to claim 1, wherein said support is secured to a slide guided on a rail, extending in a direction perpendicular to a direction of advance of said trolley.

4. The storage and transport system according to claim 1, wherein said support is formed in one piece.

5. The storage and transport system according to claim 1, wherein said chassis has a vertical stop preventing said bin from sliding in a direction of said stop when said gripping and removing device is in said retracted position and supports said bin.

6. The storage and transport system according to claim 1, wherein said bin is made of injection molded plastic material.

7. The storage and transport system according to claim 1, wherein the at least two fingerprints are arranged symmetrically with respect to at least two axes of symmetry of said bottom, including the axis of symmetry that is perpendicular to the axis along which the support slides.

8. The storage and transport system according to claim 1, wherein said climbing element comprises at least two powered gear wheels having axes of rotation substantially orthogonal to axes of rotation of the running wheels of said trolley and configured to engage with links of a substantially tensioned roller chain or teeth of a rack extending along an amount of said rack.

9. The storage and transport system according to claim 1, wherein the structural element comprises a tray, a frame or a bar.

* * * * *